(12) United States Patent
Russ et al.

(10) Patent No.: US 8,099,749 B2
(45) Date of Patent: Jan. 17, 2012

(54) VIEWER DATA COLLECTION SYSTEM AND METHOD FOR USE IN A DIRECT BROADCAST SATELLITE TELEVISION NETWORK

(75) Inventors: David P. Russ, Ft. Lauderdale, FL (US); Mark G. Welsh, Boca Raton, FL (US); Rao Sunkara, Sunrise, FL (US)

(73) Assignee: The DIRECTV Group, Inc., El Segundo, CA (US)

( * ) Notice: Subject to any disclaimer, the term of this patent is extended or adjusted under 35 U.S.C. 154(b) by 66 days.

(21) Appl. No.: 12/496,467

(22) Filed: Jul. 1, 2009

(65) Prior Publication Data

US 2009/0271813 A1    Oct. 29, 2009

Related U.S. Application Data

(63) Continuation of application No. 10/408,898, filed on Apr. 8, 2003, now abandoned.

(60) Provisional application No. 60/421,264, filed on Oct. 25, 2002.

(51) Int. Cl.
*H04H 60/32* (2008.01)
*H04H 60/33* (2008.01)
*H04N 7/173* (2011.01)

(52) U.S. Cl. .................. 725/14; 725/9; 725/16; 725/20; 725/105

(58) Field of Classification Search ................ 725/9, 14, 725/16, 20, 105
See application file for complete search history.

(56) References Cited

U.S. PATENT DOCUMENTS

| | | | | |
|---|---|---|---|---|
| 5,515,106 A | * | 5/1996 | Chaney et al. ................. | 725/48 |
| 5,521,979 A | * | 5/1996 | Deiss ............................. | 380/212 |
| 5,585,866 A | | 12/1996 | Miller et al. | |
| 5,642,418 A | | 6/1997 | Farris et al. | |
| 5,742,680 A | | 4/1998 | Wilson | |
| 5,757,416 A | | 5/1998 | Birch et al. | |
| 5,872,588 A | | 2/1999 | Aras et al. | |
| 6,202,210 B1 | | 3/2001 | Ludtke | |
| 6,442,757 B1 | | 8/2002 | Hancock et al. | |
| 7,210,159 B2 | * | 4/2007 | Roop et al. ..................... | 725/54 |
| 7,454,777 B1 | * | 11/2008 | Nishikawa et al. ........... | 725/151 |
| 2001/0037502 A1 | | 11/2001 | Kamemoto et al. | |
| 2002/0124247 A1 | | 9/2002 | Houghton | |
| 2002/0129360 A1 | | 9/2002 | Lee | |
| 2002/0174424 A1 | | 11/2002 | Chang et al. | |
| 2003/0122959 A1 | | 7/2003 | Ishida et al. | |
| 2003/0145331 A1 | | 7/2003 | Escobar et al. | |
| 2003/0171148 A1 | | 9/2003 | Weitz | |

FOREIGN PATENT DOCUMENTS

| CN | 2387588 Y | 12/2000 |
|---|---|---|
| WO | WO 97/50249 | 12/1997 |
| WO | WO 00/67098 | 11/2000 |

* cited by examiner

*Primary Examiner* — Dominic D Saltarelli

(57) ABSTRACT

A system and method for collecting viewership data. The inventive system (10) is adapted to receive a signal having multiple channels of program content and associated channel identification information. The system (10) is adapted to parse the program content and channel identification information from the received signal. The system (10) outputs selective channels of program content in response to user input and the parsed program content. The system (10) monitors the selected channels and provides viewership data with respect thereto. The viewership data includes channel identification information.

15 Claims, 5 Drawing Sheets

VIEWER DATA COLLECTION SYSTEM AND METHOD FOR USE IN A DIRECT BROADCAST SATELLITE TELEVISION NETWORK

CROSS-REFERENCE TO RELATED APPLICATIONS

This application is a continuation of U.S. application Ser. No. 10/408,898, filed Apr. 8, 2003, which claims benefit of U.S. Provisional Application Ser. No. 60/421,264, filed Oct. 25, 2002, entitled VIEWER DATA COLLECTION SYSTEM, which is incorporated by reference herein.

BACKGROUND OF THE INVENTION

1. Field of the Invention

The present invention relates to communications systems and methods. More specifically, the present invention relates to systems and methods for measuring an audience for a telecast in real time.

2. Description of the Related Art

Viewership monitoring provides critical information for broadcasters with regard to the tastes, preferences and demographics of its audience for various programs aired during a broadcast period. This information allows broadcasters to select programs to optimize viewership and revenue from subscriptions and/or advertising.

One technique for monitoring viewership is to poll the viewing habits of an audience manually. These techniques involve the use of questionnaires filled out by the viewer directly or via telephone solicitation. Unfortunately, the manual approach relies on viewer memory and requires user cooperation and feedback. Accordingly, this approach is costly, inaccurate, slow and burdensome to the viewer.

Certain systems are known in the art for automatically monitoring viewership. However, what is known about these generally proprietary systems suggests that the systems are designed to work with analog tuners. Analog tuners require a separate (physical) frequency for each channel. Digital tuners, such as those employed in direct broadcast satellite networks, are designed to receive multiple (virtual) channels on a single frequency. Hence, conventional automatic systems for monitoring viewership have not heretofore been able to function with satellite direct broadcast set top decoders.

Accordingly, a need exists in the art for an inexpensive, accurate system and method for automatically monitoring the viewing habits of viewers of direct broadcast satellite television programming.

SUMMARY OF THE INVENTION

The need in the art is addressed by the system and method for collecting viewership data of the present invention. In a most general embodiment, the inventive system is adapted to receive a signal having multiple channels of program content and associated channel identification information. The system is adapted to parse the program content and channel identification information from the received signal. The system outputs selective channels of program content in response to user input and the parsed program content. The system monitors the selected channels and provides viewership data with respect thereto. In accordance with the invention, the viewership data includes channel identification information.

In a specific implementation, the system includes a direct broadcast satellite set top box in which a tuner and a demodulator are disposed. The tuner and the demodulator operate with a processor programmed to parse the received signal and extract the program content and channel identification information therefrom. Inasmuch as the channel information is embedded in the received signal, the channel information is virtual. A smartcard is included for storing the viewership data. The data is selectively transmitted based on an event, time duration or command to a centralized data processing center where it is combined with demographic data to facilitate analysis thereof.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
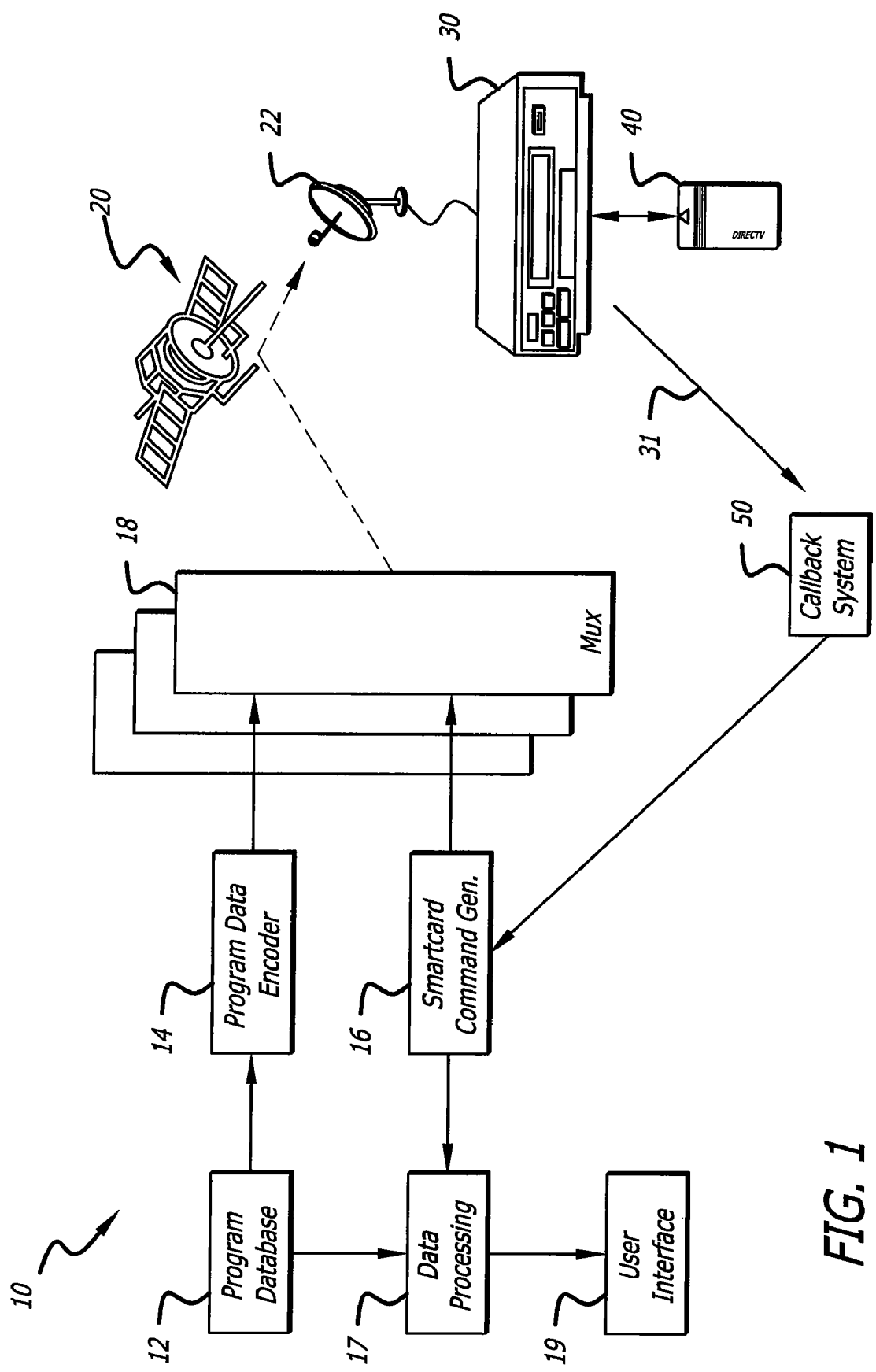
FIG. 1 is a block diagram showing an illustrative implementation of a direct broadcast satellite system with a viewership data collection system in accordance with the teachings of the present invention.

FIG. 1 is a block diagram showing an illustrative implementation of a direct broadcast satellite system with a viewership data collection system in accordance with the teachings of the present invention. As shown in FIG. 1, the system 10 includes a program database 12. The program database provides program content, channel identification, date, time and other information relevant to the provision of direct broadcast satellite television programming as will be appreciated by those of ordinary skill in the art. The database 12 may be stored on a server or other suitable storage medium. The database 12 sends information to a pair of systems that, together, comprise a program data encoder 14. The program data encoder 14 may be a proprietary security system which encodes program content with a proprietary algorithm for secure transmission and conditional access. A smartcard command generator 16 formats authorization and other commands for smartcards discussed more fully below. The smartcard command generator 16 provides the commands necessary to authorize programming and authorize the data collection capability.

The program data and smartcard commands are multiplexed into a video stream at one of a number of broadcast centers 18 and uplinked to one or more direct broadcast satellites 20 in a manner well-known to those skilled in the art. In practice, multiple video and audio channels may be embedded into a single stream for a corresponding transponder on the satellite 20. In addition, the satellite may have multiple (e.g., 34) transponders. Each transponder is adapted to receive a respective bit stream comprising, for example, 12 video channels and 20 audio channels and a separate copy of the smartcard commands. However, the uplinked streams share the smartcard commands. That is, the smartcard commands are identical on each stream. This assures that each end user receives the same command stream regardless of the transponder to which the user is tuned.

Thus, those skilled in the art will appreciate that, in the best mode, each stream is a stream of digital data which comprises 'meta data'—program guide and channel ID data and conditional access data. The channels are 'virtual' inasmuch as the multiple channels are provided on a single carrier frequency. Channel ID data is embedded in the stream and parsed out on receipt. Those skilled in the art will appreciate that this is a significant departure from conventional viewership monitoring systems in which the separate channels are transmitted on separate carrier frequencies. Hence, conventional systems operate with decoders on separate analog 'physical', as opposed to virtual, channels. The use of virtual channel assignment allows for an inexpensive relocation of virtual channels to other carrier frequencies without necessitating a change in an associated reporting system.

In the illustrative Direct to Home (DTH) direct broadcast satellite implementation, the uplinked streams are relayed via satellite 20 to a number of home-based satellite antennas 22 to which a set top boxes 30 is connected. In the best mode, the set top box 30 is adapted to interface with a smartcard 40. As is well known in the art, the smartcard allow for the set top boxes to be upgraded inexpensively.

Figure 2:
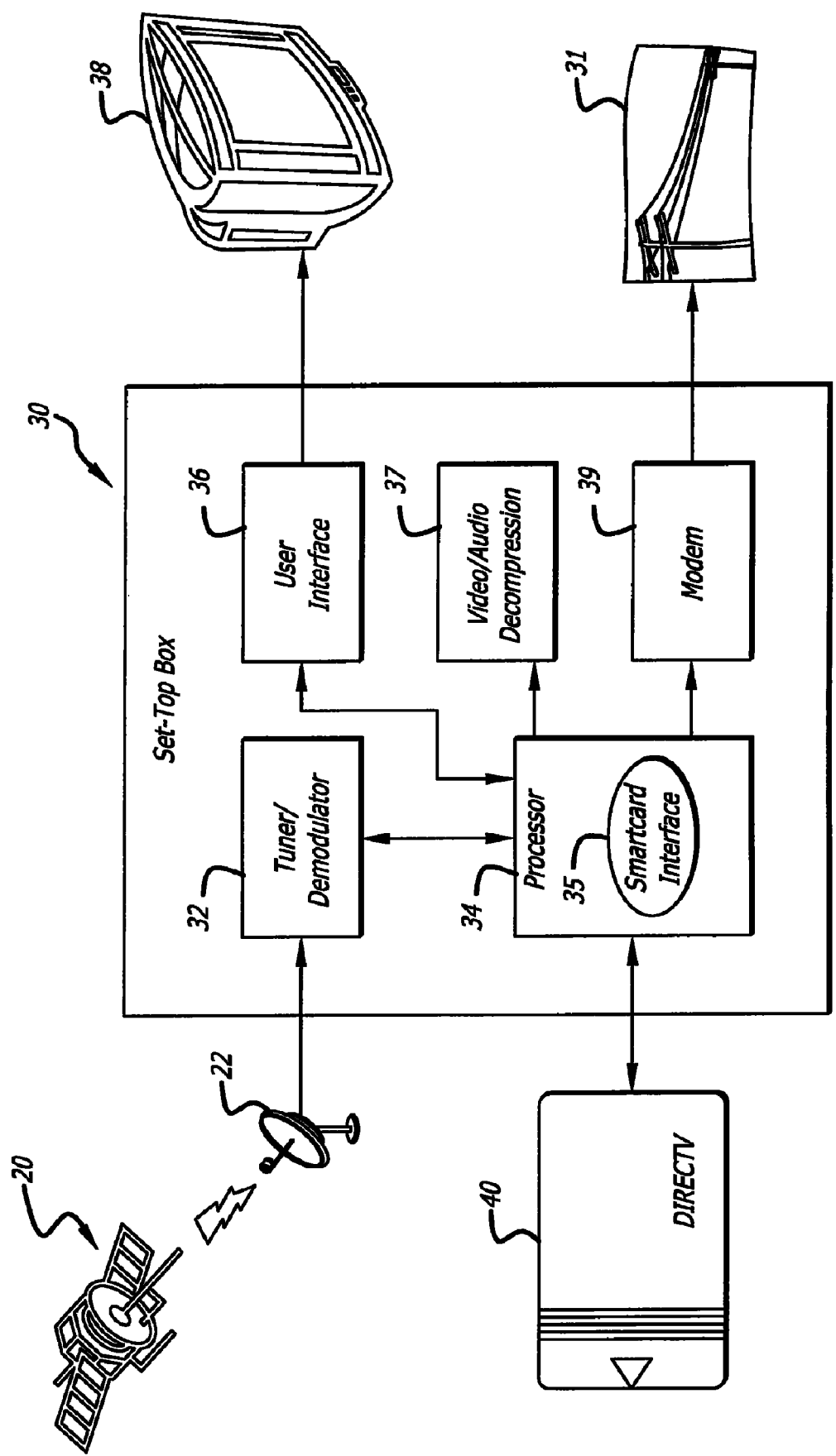
FIG. 2 is a block diagram showing an illustrative implementation of the set top box of FIG. 1 in accordance with the teachings of the present invention.

FIG. 2 is a block diagram showing an illustrative implementation of the set top box of FIG. 1 in accordance with the teachings of the present invention. The box 30 includes a digital tuner/demodulator 32 which receives, downconverts and demodulates the satellite signal from the dish antenna 22. In the illustrative embodiment, the satellite signal is encoded in accordance with the DSS transport protocol. The tuner demodulator 32 outputs a digital baseband signal to a data processor 34. The processor 34 parses the digital baseband signal into, inter alia, its program content and channel ID streams in a conventional manner. The program content is forwarded to a conventional video/audio decompression unit 37 based on channel selections made by the user via a user interface 36. In accordance with the present teachings, the channel ID associated with the user's channel selections are forwarded to the smartcard 40 via a smartcard hardware and software reader or interface 35.

Figure 3:
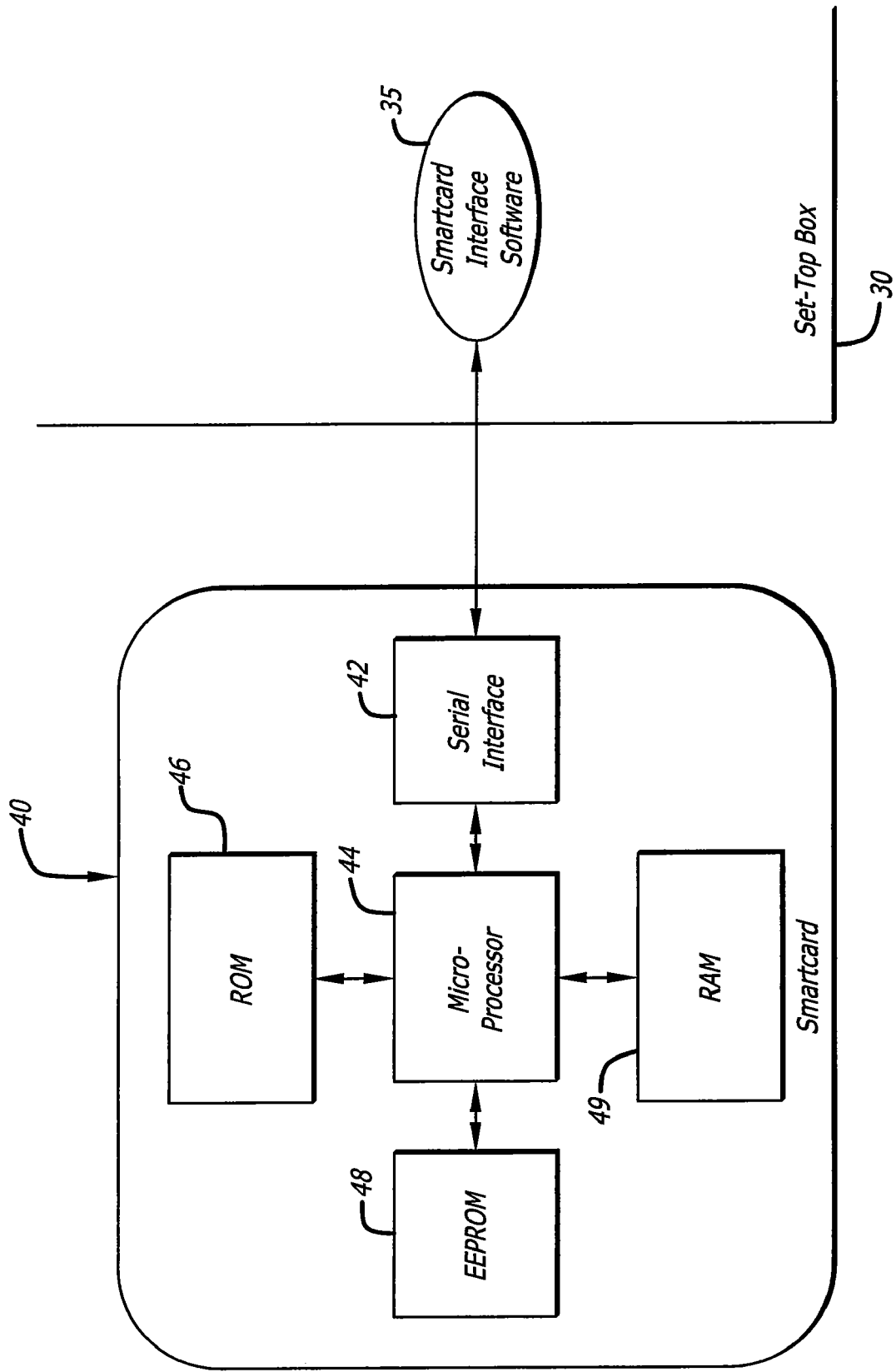
FIG. 3 is a block diagram showing an illustrative implementation of a smartcard adapted for use in accordance with the teachings of the present invention.

FIG. 3 is a block diagram showing an illustrative implementation of a smartcard adapted for use in accordance with the teachings of the present invention. As shown in FIG. 3, the smartcard 40 includes an interface 42 adapted to communicate with the interface 35 of the set top box (illustrated in FIG. 2). In practice, the smartcard may be implemented in accordance with ISO standards 7810 and 7816 parts 1-3 entitled "Identification Cards-Integrated Circuit(s) Cards with Contacts". The interface 42 effects communication between the processor 34 of the set top box 30 and a processor 44 on the smartcard 40. The smartcard processor 44 receives and executes program instructions from a read-only memory (ROM) 46 and an electrically-erasable programmable read-only memory (EEPROM) 48 and stores data in EEPROM (48) and in a random access memory 49.

Figure 4:
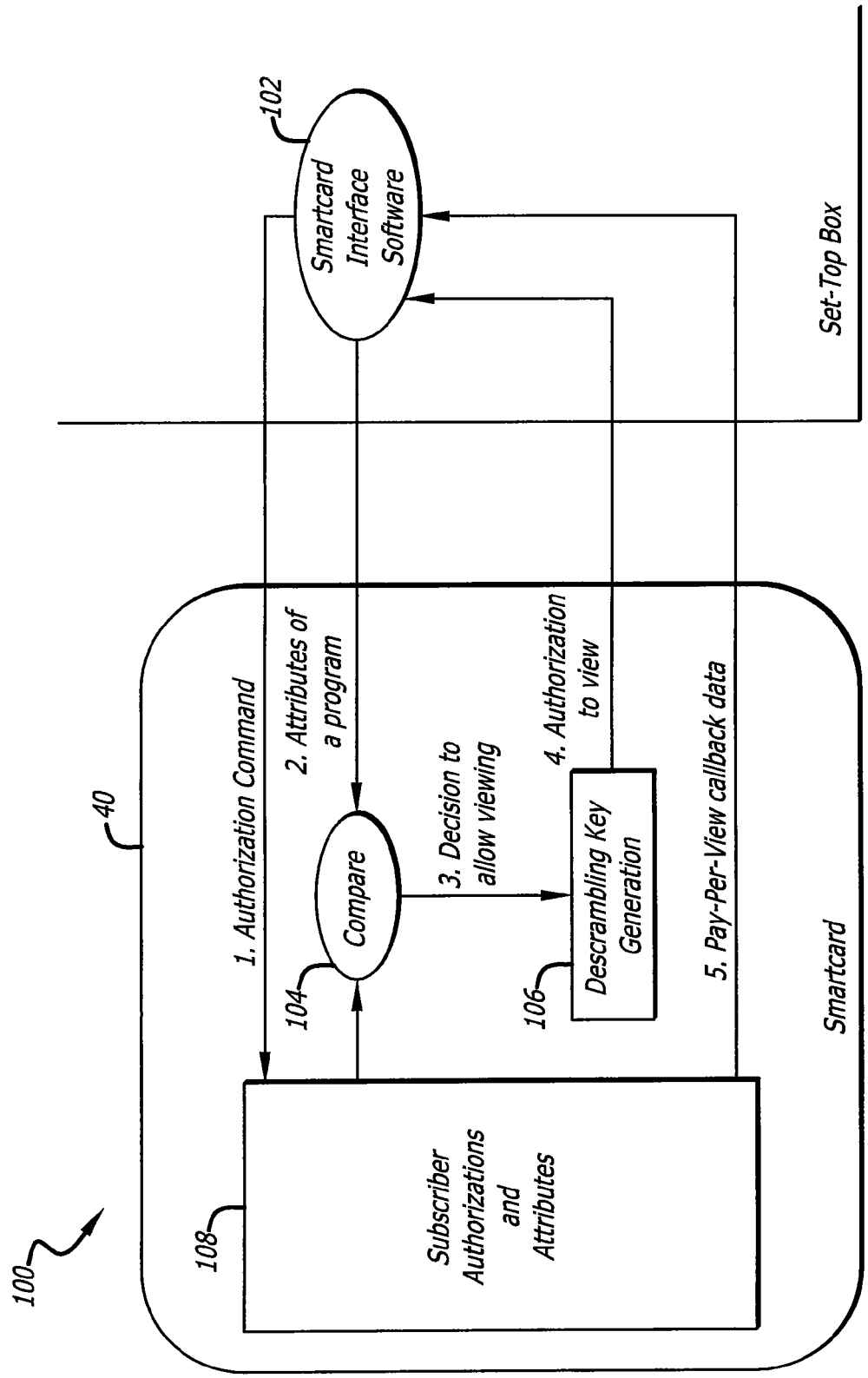
FIG. 4 is a flow diagram that illustrates the operation of the smartcard 40 in accordance with the teachings of the present invention.

FIG. 4 is a flow diagram that illustrates the operation of the smartcard 40 in accordance with the teachings of the present invention. At step 1, the smartcard commands are parsed from the received baseband digital stream by the processor 34 of the set top box and sent to the smartcard 40. The subscriber authorizations and attributes are stored in the EEPROM 48. At step 2, program attributes are parsed and send to the smartcard by the processor 34 of the set top box 30. In addition to channel ID information, the program attributes may include authorization to view a particular channel, parental ratings, and pay per view information. At step 3, the processor 44 of the smartcard compares the program attributes with the subscriber authorizations. If there is a match, at step 4, the card processor 44 generates a descrambling key and forwards the key to the set box processor 34 via interface software 102. The processor 34 then uses the key to descramble the selected program. If the attributes do not match, the card sends a message to the viewer via the set top box indicating that the channel is not available for viewing.

In accordance with the present teachings, at step 5 viewership and pay-per-view callback data is communicated from the processor 44 of the smartcard 40 to a data processing system 17 (shown in FIG. 1) via the smartcard interface 35 and interface software 102, processor 34 and a conventional dialup modem 39 of the set top box, a standard phone line 31, an automated callback system 50 and the smartcard command generator 16 (FIG. 1) on a time schedule. The callback system receives the phone call at a location relatively near to the set top box 30 and forwards the data from the phone call to the smartcard command generator 16. Those skilled in the art will appreciate that the smartcard may be programmed to automatically send viewership data on the occurrence of an event, expiration of a time period or other trigger function such that a command may not be required. Timing information for the smartcard is encoded into the uplinked stream by the smartcard command generator and/or the program data encoder.

Figure 5:
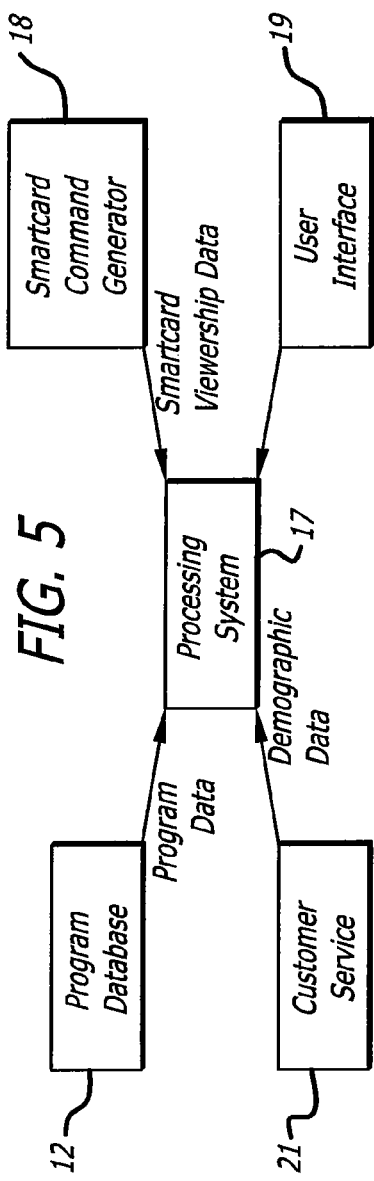
FIG. 5 is a block diagram illustrating the data processing operation of the present invention.

FIG. 5 is a block diagram illustrating the data processing operation of the present invention. As shown in FIG. 5, the data processing system 17 receives program data from the program database 12, smartcard viewership data from the smartcard command generator 18, and household demographic data from a customer service facility. The processing system combines this data in the form of reports and provides reports via a user interface 19.

Figure 6:
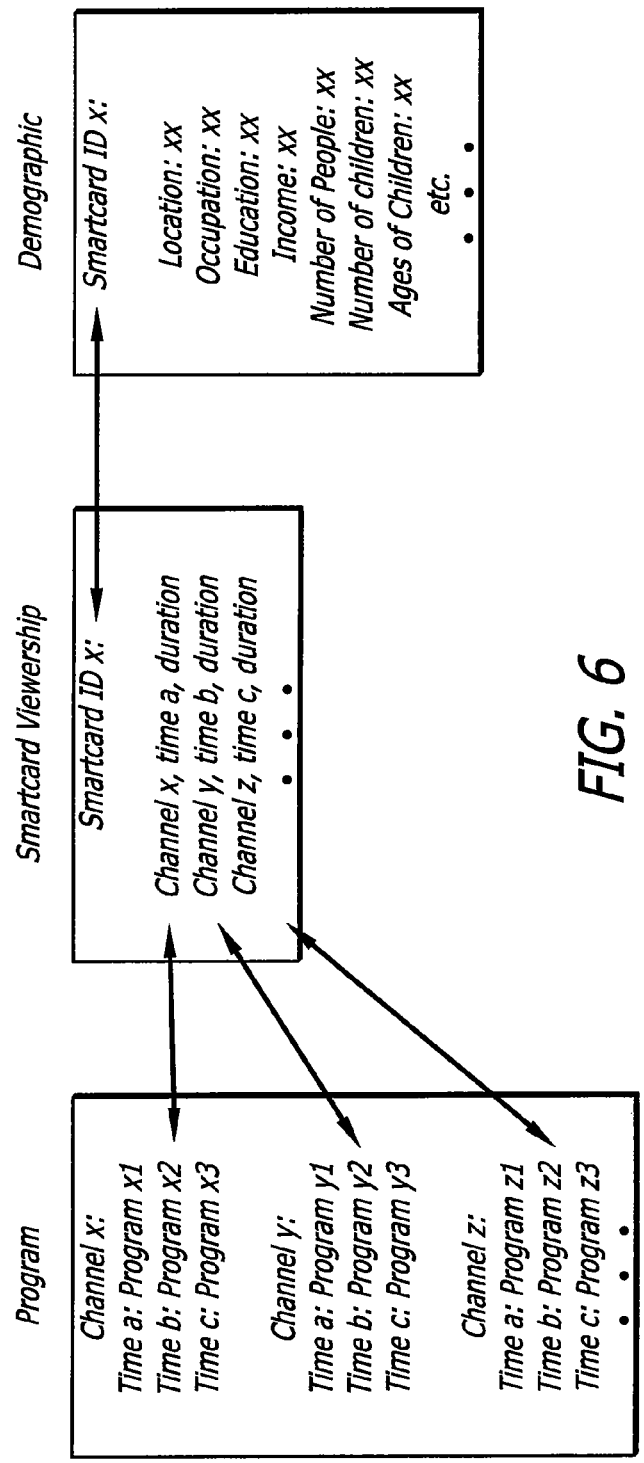
FIG. 6 shows how viewership data is correlated to demographic data in accordance with the teachings of the present invention.

FIG. 6 shows how viewership data is correlated to demographic data in accordance with the teachings of the present invention. As shown in FIG. 6, smartcard viewership data is correlated to demographic data via the smartcard ID number. The smartcard viewership data is correlated to the program data via the channel number, start time and program duration.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A data collection system comprising:
    a digital tuner/demodulator for receiving a digital video stream on a single carrier frequency from a direct broadcast satellite system, said tuner/demodulator tuning to and demodulating the stream to output a digital baseband signal, said stream comprising multiple virtual channels of program content and associated channel identification information, and smartcard commands including authorization commands for program content access;

a processor for parsing said digital baseband signal into program content, channel identification information and smartcard commands;

a user interface responsive to user input for selecting channels of said program content;

a smartcard interface that receives and forwards the channel identification associated with user selections and the smartcard commands; and a smartcard responsive to said smartcard commands and said channel identification, said smartcard authorizing viewership of user selected program content, monitoring and storing viewership data comprising channel identification information, and sending the stored viewership data to said direct broadcast satellite system.

2. The data collection system of claim 1, wherein said smartcard commands comprise authorization commands for end user usage data collection.

3. The data collection system of claim 2, wherein said smartcard is responsive to said authorization commands for end user usage data collection to send the stored viewership data to said direct broadcast satellite system.

4. The data collection system of claim 2, wherein said smartcard is responsive to said authorization commands for end user usage data collection to collect and store end user usage data.

5. The data collection system of claim 1, wherein said smartcard temporarily stores the viewership data until said smartcard sends the data to the direct broadcast satellite system.

6. The data collection system of claim 1, wherein said direct broadcast satellite system comprises a smartcard command generator for providing the smartcard commands in the digital video stream and for receiving the viewership data sent by the smartcard.

7. The data collection system of claim 6, wherein said direct broadcast satellite system includes a data processing system for receiving program data from a program database, smartcard viewership data from the smartcard command generator and household demographic data from a customer service facility and combining the data into viewership data reports.

8. The data collection system of claim 1, wherein said direct broadcast satellite system comprises a satellite having multiple transponders each adapted to receive a respective digital video stream comprising multiple virtual channels and a separate copy of the identical smartcard commands.

9. The data collection system of claim 1, wherein said smartcard is responsive to the smartcard commands to generate and forward a descrambling key to the processor, said processor using the descrambling key to descramble the user selected program content, said smartcard responsive to the smartcard commands to collect end user usage data for the selected program content.

10. A data collection system comprising:
a digital tuner/demodulator for receiving a digital video stream on a single carrier frequency from a direct broadcast satellite system, said tuner/demodulator demodulating the stream to output a digital baseband signal, said stream comprising multiple virtual channels of program content and associated channel identification information and having smartcard commands including authorization commands for program content access and end user data collection;

a processor for parsing said digital baseband signal into program content, channel identification information and smartcard commands;

a user interface responsive to user input for selecting channels of said program content;

a smartcard interface that receives and forwards the channel identification associated with user selections and the smartcard commands; and a smartcard responsive to said smartcard commands to generate and forward a descrambling key to the processor, said processor using the descrambling key to descramble the user selected program content, said smartcard responsive to the smartcard commands to collect and store end user usage data including said channel identification for the selected program content and send the stored data to said direct broadcast satellite system.

11. A data collection system comprising:
a direct broadcast satellite system comprising a program database in which program content resides, a program encoder for encoding program content, and a smartcard command generator for generating smartcard commands including authorization commands for program content access;

a multiplexer for multiplexing the encoded program content and smartcard commands for multiple virtual channels into a digital video stream on a single carrier frequency for transmission to at least one end user;

a satellite having multiple transponders each adapted to receive a respective digital video stream comprising multiple virtual channels and a separate copy of the smartcard commands;

a set top box for each end user comprising,
a digital tuner/demodulator for tuning to a particular transponder channel and receiving the digital video stream and demodulating the stream to output a digital baseband signal;

a processor for parsing said digital baseband signal into program content, channel identification information and smartcard commands;

a user interface responsive to user input for selecting channels of said program content; and a smartcard interface that receives and forwards the channel identification associated with user selections and the smartcard commands; and a smartcard responsive to said smartcard commands and said channel identification, said smartcard authorizing viewership of user selected program content, monitoring and storing viewership data including channel identification information, and sending the stored viewership data to said direct broadcast satellite system.

12. The data collection system of claim 11, wherein the smartcard command generator provides the commands necessary to authorize the data collection capability, said smartcard responsive to these commands to collect and store end user usage data for the selected program content.

13. The data collection system of claim 12, wherein the smartcard is responsive to said smartcard commands to generate and forward a descrambling key to the processor, said processor using the descrambling key to descramble the user selected program content.

14. The data collection system of claim 11, wherein said direct broadcast satellite system comprises a data processing system for receiving program data from a program database, smartcard viewership data from the smartcard command generator and household demographic data from a customer service facility and combining the data into viewership data reports.

15. The data collection system of claim 11, wherein the separate copies of the smartcard commands uplinked to the satellite are identical on each digital video stream.

\* \* \* \* \*